United States Patent
Vanspeybroeck et al.

(10) Patent No.: US 7,115,684 B2
(45) Date of Patent: Oct. 3, 2006

(54) HIGH GLOSS RUBBER MODIFIED MONOVINYLIDENE AROMATIC POLYMERS PRODUCED BY A MASS POLYMERIZATION PROCESS

(75) Inventors: Rony S. Vanspeybroeck, Bellem (BE); Mercedes R. Galobardes, Saginaw, MI (US); Joseph M. Ceraso, Midland, MI (US); Gilbert Bouquet, Ghent (BE); Dominque Maes, Lochristi (BE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/541,925

(22) PCT Filed: Jan. 15, 2004

(86) PCT No.: PCT/US2004/000978

§ 371 (c)(1),
(2), (4) Date: Jul. 12, 2005

(87) PCT Pub. No.: WO2004/072172

PCT Pub. Date: Aug. 26, 2004

(65) Prior Publication Data

US 2006/0122331 A1    Jun. 8, 2006

Related U.S. Application Data

(60) Provisional application No. 60/445,557, filed on Feb. 5, 2003.

(51) Int. Cl.
C08F 279/02    (2006.01)
C08F 2/38    (2006.01)

(52) U.S. Cl. ............ 525/316; 525/256; 525/282; 525/308; 525/314; 525/904

(58) Field of Classification Search ........... 525/314, 525/316, 256, 282, 308, 904
See application file for complete search history.

(56) References Cited

U.S. PATENT DOCUMENTS

| | | | |
|---|---|---|---|
| 2,646,418 A | 7/1953 | Lang | |
| 2,727,884 A | 10/1955 | McDonald et al. | |
| 4,311,819 A | 1/1982 | Tung et al. | |
| 4,409,369 A | 10/1983 | Lyons et al. | |
| 4,581,429 A | 4/1986 | Solomon et al. | |
| 5,721,320 A | 2/1998 | Priddy et al. | |
| 6,255,402 B1 | 7/2001 | Boutillier et al. | |
| 6,255,448 B1 | 7/2001 | Grimaldi et al. | |
| 6,262,179 B1 | 7/2001 | Nicol | |

FOREIGN PATENT DOCUMENTS

| | | |
|---|---|---|
| WO | WO99/62975 | 12/1999 |
| WO | WO01/74908 | 10/2001 |

*Primary Examiner*—Fred Teskin

(57) ABSTRACT

The present invention relates to a mass polymerized rubber-modified polymeric composition comprising a continuous matrix phase of a polymer of a monovinylidene aromatic monomer, and optionally, an ethylenically unsaturated nitrile monomer, and rubber particles produced from a functionalized diene rubber.

14 Claims, No Drawings

HIGH GLOSS RUBBER MODIFIED MONOVINYLIDENE AROMATIC POLYMERS PRODUCED BY A MASS POLYMERIZATION PROCESS

CROSS REFERENCE STATEMENT

This application claims the benefit of U.S. Provisional Application No. 60/445,557, filed Feb. 5, 2003.

BACKGROUND OF THE INVENTION

The present invention relates to rubber modified polymers obtained from vinyl aromatic monomers.

Rubber modified polymers, such as high impact polystyrene (HIPS) and acrylonitrile-butadiene-styrene (ABS), are typically produced by mass polymerizing styrene or styrene/acrylonitrile in the presence of dissolved rubber. ABS is more typically produced using an emulsion polymerization process which produces small rubber particles and high gloss products, but with increased conversion costs.

In the preparation of rubber modified polymers, the rubber particle size and morphology play an important role in controlling the physical properties of the final product. The final rubber particle size can be determined by a number of different parameters including shear, viscosity, and interfacial tension. Increased shear after phase inversion can be used to reduce particle size, however this adds expense and complexity to the process. The final rubber particle size can also be influenced by the viscosity ratio of the disperse phase/continuous phase, and the viscosity of the continuous phase polymer. Sizing readily occurs when the viscosity ratio is between 0.2 and 1; and with higher viscosity of the continuous phase, the greater the ease of particle breakup. The rubber phase viscosity is determined by the rubber level and by the solution viscosity of the rubber. Additionally, grafting and crosslinking of the rubber will increase rubber viscosity. Interfacial surface tension will also influence rubber particle size and morphology, wherein a reduction of the interfacial tension can be achieved by utilizing the compatible block rubbers or by grafting to make compatible rubbers in-situ. Compatible block rubbers are characterized by having a block miscible with the continuous phase and a block miscible with the discontinuous phase. A reduction of the interfacial tension will facilitate the sizing process thereby increasing the flexibility. In HIPS compositions, compatible rubbers include styrene-butadiene block rubbers. In ABS compositions, styrene-butadiene block rubbers are not compatible since polystyrene is not miscible with the SAN continuous phase. SAN-butadiene block rubbers are compatible with ABS, but are not commercially available. Therefore in ABS polymer compositions, compatible block copolymers have to be produced in situ via grafting. The use of functionalized rubbers has been investigated in order to make such compatible block rubbers in-situ in both HIPS and ABS processes due to the economic advantage.

U.S. Pat. No. 5,721,320 by Priddy et al. discloses a free radical polymerization in the presence of a functionalized diene rubber having a stable free radical group such that a vinylaromatic-diene block or copolymer-diene rubber is formed. However, Priddy refers to the production of transparent HIPS and ABS, wherein the rubber particle size is very small (0.1 micron), which is insufficient for many high impact applications.

U.S. Pat. No. 6,262,179 by Atochem discloses a process for producing vinyl aromatic polymers in the presence of a stable free radical. However, the resultant product has a very wide rubber particle size distribution, with a large average rubber particle size, which can is negatively affect physical properties, such as gloss.

U.S. Pat. No. 6,255,402 by Atochem discloses a process of polymerizing at least one vinyl aromatic monomer in the presence of a rubber comprising a group which generates a stable free radical. However, this process utilizes a wide variety of rubbers, including those having high solution viscosity, which can negatively affect physical properties, for example, gloss, of the polymer.

U.S. Pat. No. 6,255,448 by Atochem discloses a process for the polymerization of at least one monomer in the presence of a stable free radical having substitution in the beta position. However, these beta substituted stable free radicals can have increased cost and may not be used in anionic coupling due to the reactivity of the substituent.

WO 99/62975 by Atochem discloses a process using a stable free radical and an initiator. This process also utilizes high viscosity rubbers which can negatively affect gloss and other physical properties.

WO 01/74908 by BASF discloses a method of polymerization in the presence of a stable free radical and a thiol compound. U.S. Pat. No. 4,581,429 discloses the use of alkoxy amines (>N—O—X) in controlled radical polymerization, wherein the alkoxy amine forms a free radical (X.) which is suitable as a free radical initiator and a stable free radical (>N—O.). However, this method does not include the production of rubber modified polymers.

Therefore, there remains a need for an efficient and cost effective mass process for achieving the rubber particle size, distribution and morphology desired, utilizing in-situ produced block rubbers which offer enhanced physical properties and efficient processing.

SUMMARY OF THE INVENTION

The present invention relates to a mass polymerized rubber-modified polymer composition comprising:

(i) a continuous matrix phase comprising a polymer of a monovinylidene aromatic monomer, and optionally, an ethylenically unsaturated nitrile monomer, and (ii) discrete rubber particles dispersed in said matrix, said rubber particles produced from a rubber component comprising from 5 to 100 weight percent of a functionalized diene rubber having at least one functional group per rubber molecule capable of enabling controlled radical polymerization;

wherein the composition is further characterized by:
 a) a volume average rubber particle size of from about 0.15 to 0.35 micron,
 b) a total rubber phase volume between 12 and 45 percent, based on the total volume of the combination of the matrix phase and the rubber particles;
 c) a partial rubber phase volume between 2 and 20 percent characterized by rubber particles having a volume average particle size of greater than 0.40 microns; and
 d) a crosslinked rubber fraction of at least 85 percent by weight, based on the total weight of the rubber particles.

This composition offers small average rubber particles size, and high rubber cross-linking, which are essential for high gloss and low gloss sensitivity; while maintaining good toughness properties by the rubber phase volume and broad particle size distribution.

DESCRIPTION OF THE PREFERRED EMBODIMENTS

Monovinylidene aromatic monomers useful for both the matrix and block copolymer, if used, include any vinyl aromatic monomers such as those described in U.S. Pat. Nos. 4,666,987, 4,572,819 and 4,585,825, and 5,721,320 which are incorporated by reference herein. The optional ethylenically unsaturated nitrile monomer includes, but is not limited to acrylic monomers such as acrylonitrile and methacrylonitrile. Additionally, the copolymer can comprise additional monomers such as other vinyl aromatics, methacrylic acid, methyl methacrylate, butyl acrylate, acrylic acid, methyl acrylate maleimide, phenylmaleimide, or maleic anhydride. Preferably the matrix polymer is polystyrene or a copolymer of styrene and acrylonitrile. The polymerization is conducted in the presence of predissolved elastomer/rubber to prepare impact modified, grafted rubber containing products, examples of which are described in U.S. Pat. Nos. 2,694,692; 3,123,655; 3,243,481; 3,346,520; 3,639,522; 3,658,946 and 4,409,369; and which are incorporated by reference herein. The composition of the present invention particularly relates to compositions commonly referred to as high impact polystyrene (HIPS) and acrylonitrile-butadiene-styrene copolymers (ABS).

The Mw of the matrix phase can vary greatly dependent upon the applications of the rubber modified polymer. Typically, the Mw can vary from 50,000 to about 300,000 amu. Mw is the weight average molecular weight measured using gel permeation chromatography with a polystyrene standard.

Typically, the rubber component used in the composition of the present invention has a solution viscosity (5 percent in styrene at 20° C.) of less than 200 centipoise (cps), generally, less than 100 (cps). Preferably, the rubber component used in the composition of the present invention comprises a low viscosity rubber having a solution viscosity (5 percent in styrene at 20° C.) in the range of 5 to less than 50 centipoise (cps), preferably from 10, more preferably from 15, and most preferably from 20 to less than 45, preferably to less than 40, more preferably to less than 35, and most preferably to less than 30 cps. It is important to note that the rubber component may comprise more than one rubber, and that any individual rubber may have a higher solution viscosity, as long as the combined solution viscosity of all rubbers within the rubber component is within the limitations taught above.

The rubber component must contain at least one functionalized diene rubber. Suitable functionalized diene rubbers include rubbers derived from 1,3-conjugated dienes such as butadiene, isoprene, chloroprene or piperylene, and the like. These rubbers include diene homopolymers, as well as copolymers and block copolymers of alkadienes and a vinyl aromatic monomer. Suitable functionalized copolymer rubbers for inclusion within the rubber component include copolymers of alkadienes including 1,3-conjugated dienes such as butadiene, isoprene, chloroprene or piperylene and a monovinylidene aromatic monomer. Preferably, the functionalized copolymer is a functionalized block copolymer wherein the block produced from the monovinylidene aromatic monomer is at least 8 weight percent, based on the total weight of the block copolymer. The block copolymers can contain any number of blocks such as AB, ABA, ABAB, ABABA, ABABAB and so on. Preferably, the functionalized block copolymer rubber contains at least 8, more preferably at least 10, and most preferably at least 12 to 40, preferably to 35, more preferably to 30 and most preferably to 25 weight percent polymerized vinyl aromatic block, based on the total weight of the block copolymer. It is known that a small amount of tapering can occur in the production of such block rubbers. The functionalized diene rubber may have any architecture, such as linear or star branched, and a microstructure having any vinyl/cis/trans ratio, as long as the functionalized diene rubber meets the other requirements stated previously. Most preferred functionalized diene rubbers are functionalized diblock copolymers of 1,3-butadiene and styrene.

Such rubbers are widely known in the art as well as methods for their manufacture as disclosed in *Science and Technology of Rubber* (Academic Press,) Ed. James E. Mark, Burak Erman, Frederick R. Eirich-Chapter 2. VIII, pgs. 60–70.

The functionalized diene rubber contains a minimum of 1 functional group per rubber molecule. The functional group is defined as a functionality which enables is controlled radical polymerization. Controlled radical polymerization employs the principle of dynamic equilibration between growing free radicals and dormant or unreactive species as disclosed in "Controlled/Living Radical Polymerization" (2000) p. 2–7 ACS Symposium series, 768.

The functionality included in the functionalized copolymer rubber can enable controlled radical polymerization through a number of different mechanisms including by:

I) stable free radical polymerization, e.g. nitroxide mediated polymerization;

II) metal catalyzed atom transfer radical polymerization (ATRP);

III) reversible addition-fragmentation chain transfer (RAFT); and

IV) a degenerative transfer process based on a thermodynamically neutral (at the propagation stage) exchange process between a growing radical, and a dormant species; and other degenerative transfer processes as described in "Chapter 1 Overview: Fundamentals of Controlled/Living Radical Polymerization" of *Controlled Radical Polymerization* by Matyjaszewski, 1998, pages 2–30 and Handbook of Radical Polymerization, Ed. K. Matyjaszewski, T. P. Davis (Wiley) p. 383–384.

The functional group can be attached to the rubber utilizing any acceptable method which places at least one functional group on the backbone or chain end of the diene rubber. In one embodiment, the functional group is attached to the rubber via the end of the polymer chain and no random attachment of the functional group occurs on the rubber polymer chain, for a maximum of 2 functional groups, one on each end. Examples of such are included in U.S. Pat. No. 5,721,320. In a preferred embodiment, the functionalized diene rubber does not contain any other functionalities which are reactive during the radical polymerization process, other than the typical unsaturation present in diene rubbers.

In one embodiment, the functional group will generate a stable free radical which is capable of enabling controlled free radical polymerization. Stable free radicals include compounds which can act as radical polymerization inhibitors such as nitroxide radicals, for example, 2,2,6,6,-tetramethyl-1-piperidinyloxy (TEMPO) as disclosed in U.S. Pat. No. 6,262,179 and U.S. Pat. No. 5,721,320, both of which are incorporated herein by reference. Other stable free radical compounds include, but are not limited to 2,2,6,6-tetramethyl-1-[1-[4-(oxiranylmethoxy)phenyl]ethoxy]-piperidine and 3,3,8,8,10,10-hexamethyl-9-[1-[4-(oxiranylmethoxy)phenyl]ethoxy]-1,5-dioxa-9-azaspiro[5.5] undecane.

The stable free radical group is defined as a substituent which is capable of forming a stable free radical upon activation as described in U.S. Pat. No. 5,721,320. Other nitroxy containing compounds can be found in U.S. Pat. No. 4,581,429 by Solomon et al. which is incorporated herein by reference.

Additionally, non-functionalized rubbers can be used in combination with the functionalized diene rubbers within the rubber component. In this case, typically at least 5 weight percent of the rubber component is a functionalized diene rubber, generally at least 10, preferably at least 15, more preferably at least 20 and most preferably at least 25 weight percent, based on the total weight of all rubbers within the rubber component, to about 60, preferably to about 70, more preferably to about 80, even more preferably to about 90, and most preferably to about 100 weight percent. The non-functionalized rubber can be any rubber typically used in rubber modified polymers including diene homopolymers and copolymers with vinyl aromatics; block copolymers, star branched rubbers, linear rubbers, and the like.

The amount of rubber initially dissolved in the vinyl aromatic monomer is dependent on the desired concentration of the rubber in the final rubber-reinforced polymer product, the degree of monomer conversion during polymerization and the viscosity of the solution. The rubber is typically used in amounts such that the rubber-reinforced polymer product contains from about 2 to about 30 percent, preferably from about 3 to about 20 percent, and more preferably from about 3 to about 15 weight percent rubber, based on the total weight of the vinyl aromatic monomer and rubber components, expressed as rubber or rubber equivalent. The term "rubber" or "rubber equivalent" as used herein is intended to mean, for a rubber homopolymer, such as polybutadiene, simply the amount of rubber, and for a block copolymer, the amount of the copolymer made up from monomer which when homopolymerized forms a rubbery polymer, such as for a butadiene-styrene block copolymer, the amount of the butadiene component of the block copolymer.

The rubber reinforced polymer can be prepared by dissolving the functionalized rubber in the vinyl aromatic monomer and polymerizing the mixture in the presence of the functional group. This process can be conducted using conventional techniques known in the art for preparing rubber reinforced polymers such as high impact polystyrene (S) and ABS, which are described in U.S. Pat. Nos. 2,646,418, 4,311,819 and 4,409,369 and are incorporated herein by reference.

Initiators may optionally be used in the process of the present invention. Useful initiators include free radical initiators such as peroxide and azo compounds which will accelerate the polymerization of the vinyl aromatic monomer. Suitable initiators include but are not limited to tertiary butyl peroxyacetate, dibenzoyl peroxide, dilauroyl peroxide, 1-3-bis-(tertiarybutylperoxy)-3,3,5-trimethyl cyclohexane, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butyl-peroxypivilate, and azo compounds such as azobisisobutyro-nitrile, azobis-2,4-dimethylvaleronitrile, azobiscyclohexanecarbo-nitrile, azobismethyl isolactate and azobiscyanovalerate.

Initiators may be employed in a range of concentrations dependent on a variety of factors including the specific initiators employed, the desired levels of polymer grafting and the conditions at which the mass polymerization is conducted. Typically, the initiator is employed in a range from 50 to 500, preferably from 75 to 250, parts per million based on the total weight of the initial feed.

Additionally, a solvent may be used in the process of the present invention. Acceptable solvents include normally liquid organic materials which form a solution with the rubber, vinyl aromatic monomer and the polymer prepared therefrom. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene and xylene being most preferred. In general, the solvent is employed in amounts sufficient to improve the processability and heat transfer during polymerization. Such amounts will vary depending on the rubber, monomer and solvent employed, the process equipment and the desired degree of polymerization. If employed, the solvent is generally employed in an amount of up to about 35 weight percent, preferably from about 5 to about 25 weight percent, based on the total weight of the initial feed.

Other materials/additives may also be present in the process of the present invention, including plasticizers, for example, mineral oil; flow promoters, lubricants, antioxidants, for example, alkylated phenols such as di-tertbutyl-p-cresol or phosphites such as trisnonyl is phenyl phosphite; catalysts, for example acidic compounds such as camphorsulfonic acid; mold release agents, for example, zinc stearate, or polymerization aids, for example, chain transfer agents such as an alkyl mercaptan, for example, n-dodecyl mercaptan. If employed, the chain transfer agent is generally employed in an amount of from about 0.001 to about 0.5 weight percent based on the total weight of the polymerization mixture to which it is added. Additionally a low molecular weight additive having a surface tension of less than 30 dyne/cm according to AST: D1331 at 25° C., such as polydimethylsiloxane or a fluorinated polymer, can be added to the composition of the present invention. Typically, such additives are used in amounts of 0.05 to 0.5 weight percent, based on the total weight of the composition.

The composition of the present invention is further characterized by:
a) a volume average rubber particle size of from about 0.15 to 0.35 micron,
b) a total rubber phase volume between 12 and 45 percent, based on the total volume of the combination of the matrix phase and the rubber particles;
c) a partial rubber phase volume between 2 and 20 percent characterized by rubber particles having a volume average particle size of greater than 0.40 microns; and
d) a crosslinked rubber fraction of at least 85 percent by weight, based on the total weight of the rubber particles.

The rubber particle size can have either a broad monomodal particle size distribution defined by a polydispersity ($D_2$) as determined by ($D_{(z+1)}/D_n$ as defined in the examples) of 1.25 or larger, or a bimodal particle size distribution, with the total volume particle size average being from 0.15 to 0.35 micron, preferably from 0.15 to 3, more preferably from 0.2 to 0.3 micron; with a rubber volume fraction between 2 and 20 percent, characterized by rubber particles having volume average particle size of greater than 0.40 micron. Therefore, at least 5 percent of the rubber phase volume is made up of rubber particles greater than 0.40 microns. Typically, the remaining fraction of rubber component will comprise volume average particle sizes which are smaller in order to meet the limitation of an overall volume average rubber particle size of from 0.15 to 0.35.

The rubber-modified polymers of the present invention can have both a broad monomodal particle size distribution, or a multi-modal, for example, bimodal particle size distribution. In either case, the rubber components can comprise one rubber or a blend of rubbers. In particular, more than one rubber can be used in a monomodal or bimodal process. A bimodal rubber particle size distribution is defined as having two distinct peaks of particles when grafted on axis' of particle size vs. volume fraction; one peak designating smaller particles and the other peak designating larger particles.

Typically, in a bimodal particle size distribution, the larger particle fraction will have a volume average particle size of from 0.5, preferably from 0.6, more preferably from 0.7 and most preferably from 0.8 to 3, preferably to 2.5, more preferably to 2 and most preferably to 1.5 microns. Typically, the smaller particle fraction will have a volume average particle size of from 0.075, preferably from 0.1 to 0.3, preferably to 0.25, and more preferably to 0.2 microns. Particle sizes are determined using Transmission Electron Microscopy (TEM) analysis.

The composition of the present invention is further characterized by a total rubber phase volume between 12 and 45 percent, based on the total volume of the combination of the matrix phase and the rubber particles; and a partial rubber phase volume of at least 2 percent, characterized by rubber particles having a volume average particle size of greater than 0.40 micron. The partial rubber phase volume with a volume average particle size of greater than 0.4 micron is preferably between 2 percent and 20 percent, more preferably between 4 percent and 18 percent, and most preferably between 6 and 16 percent.

Additionally, the composition of the present invention is further characterized by a crosslinked rubber fraction of at least 85 percent by weight, based on the total weight of the rubber particles. The crosslinked rubber fraction is determined by measuring total rubber and soluble rubber in the sample. The percent of cross-linked rubber is calculated with the following equation:

Percent crosslinked rubber =
$$\frac{(\text{total rubber } (Tr) - \text{soluble rubber } (Ts)) \times 100}{\text{total rubber } (Tr)}$$

To measure the total rubber, 250 mg of sample is weighed to the nearest 0.001 mg and placed in a vial to which 5 mL+0.1 mL of bromoform is added. The sample is placed on a shaker for a minimum of 1.5 hours to insure that the continuous phase is dissolved and that there are no significant pieces of undispersed rubber. The sample is then transferred to a 1 mm liquid FT IR cell and the sample is scanned from 4000 to 400 cm-1. The rubber in the sample is determined by integrating the band at 970 cm-1 (in the absorbance mode) and is calculating the amount of rubber using external standard solutions of the rubber.

To measure the soluble rubber, the solution from above is placed in a suitable centrifuge tube and centrifuged for 10 minutes at 8000 G. The clear bottom layer is then carefully removed using a syringe, placed in the liquid cell and scanned by FT IR as described above. The amount of soluble rubber is calculated using external standard solutions of the rubber. Note:

1) The bromoform used for this analysis must be spectroscopically clean in the area of 1000–900 cm-1. This is accomplished by passing the bromoform through a silica column. A blank of the bromoform should be analyzed at least once per day to insure that the purity has not changed.
2) Care must be taken to insure that the liquid cell is thoroughly cleaned in between analyses. Residue of rubber from previous samples either in the cell or on the cell windows will seriously effect the accuracy of the results.
3) External standard solutions should be made to coincide with the approximate concentrations of the total and soluble rubber solutions. The area of the band at 990 cm-1 (y axis) is plotted against the concentration of rubber in units of mg/mL (x-axis) to construct the calibration curve. The best linear fit for the curve is then calculated as A=mC+b where A is the area, m is the slope of the curve, C is the concentration in mg/mL and b is the y intercept. When more then one type of rubber is present in the polymer the standards should be made to reflect the expected rubber composition.
4) Total rubber (Tr) in the sample is calculated using the equation of the best linear fit of the standards and the initial weight of the sample.

$$Tr = \frac{C * V}{W}$$

C is the concentration of rubber in the liquid cell calculated as $$C = \frac{Aspl - b}{m}$$

where Asp1 is the integrated area of the 970 cm-1 band in the sample, b is the y-intercept and m is the slope.

V is the volume of bromoform used to dissolve the sample.

W is the initial weight of the sample.

5) Soluble rubber Ts is calculated using the equation of the best linear fit of the standards and the initial weight of the sample.

$$Ts = \frac{C * V}{W}$$

C is the concentration of rubber in the liquid cell calculated as $$C = \frac{Aspl - b}{m}$$

where Asp1 is the integrated area of the 970 cm-1 band in the sample, b is the y-intercept and m is the slope.

V is the volume of bromoform used to dissolve the sample.

W is the initial weight of the sample.

The polymerization can be achieved by a number of processes and is preferably conducted in one or more substantially linear stratified flow or so-called plug-flow type reactors, as described in U.S. Pat. No. 2,727,884, which is incorporated herein by reference. In one embodiment, the composition of the present invention is produced using a linear polymerization process, utilizing one or more polymerization reactors to produce a rubber modified polymer having a broad monomodal rubber particle size distribution. In another embodiment, recirculation can be combined with the linear process. Recirculation is a technique wherein a portion of a partially polymerized feed is added back at an earlier stage of the polymerization process. If bimodal particle size distributions are desired, it can be accomplished by any acceptable method including those disclosed in U.S. Pat. Nos. 4,221,883; 5,240,993; and 4,146,589, all of which are incorporated herein by reference, as well as in EP-96,447B and EP-892,820. In one aspect, a first mixture of a solution of a monovinylidene aromatic monomer, optionally an ethylenically unsaturated nitrile monomer, and a rubber is mass polymerized in the presence of an initiator under conditions sufficient to form a partially polymerized continuous phase containing polymer and discrete particles of highly grafted rubber having a specific volume average diameter. A second rubber-containing mixture is subsequently admixed with the partially polymerized feed under conditions such that the previously formed rubber particles remain dispersed throughout the continuous polymer phase. The newly added rubber is dispersed as discrete particles having a second volume average diameter. Bimodal compositions can also be obtained by producing each particle size in a separate reactor, combining both reaction streams and continuing the polymerization. Alternatively, melt blending can be used to combine two different rubber modified polymers to produce a rubber modified polymer having a bimodal particle size distribution, or a composition having two different rubber particle densities.

In a preferred embodiment, the present invention is an acrylonitrile-butadiene-styrene (ABS) rubber modified polymer consisting essentially of:
  a continuous matrix phase comprising a polymer of a monovinylidene aromatic monomer, and optionally, an ethylenically unsaturated nitrile monomer, and discrete rubber particles dispersed in said matrix, said rubber particles produced from a rubber component comprising from 5 to 100 weight percent of a functionalized conjugated diene/monovinylidene aromatic copolymer rubber containing 40 weight percent or less monovinylidene aromatic monomer and having at least one functional group per rubber molecule capable of enabling controlled radical polymerization;

wherein the composition is further characterized by:
  a) a volume average rubber particle size of from about 0.15 to 0.35 micron,
  b) a total rubber phase volume between 12 and 45 percent, based on the total volume of the combination of the matrix phase and the rubber particles;
  c) a partial rubber phase volume between 2 and 20 percent characterized by rubber particles having a volume average particle size of greater than 0.40 microns; and
  d) a crosslinked rubber fraction of at least 85 percent by weight, based on the total weight of the rubber particles.

The rubber modified polymers of the present invention can be used in a variety of applications including injection molding and thermoforming of refrigerator liners, household appliances, toys, automotive applications and furniture. The rubber modified polymers produced can also have applications in the production of articles containing other thermoplastic polymers, in that the rubber modified polymers have improved welding properties when compared to other rubber modified polymers of the prior art. Additionally, the polymers produced can be blended with other polymers for additional applications.

The following examples are provided to illustrate the present invention. The examples are not intended to limit the scope of the present invention and they should not be so interpreted. Amounts are in parts by weight unless otherwise indicated.

EXAMPLES

The Compositions in TABLE I are prepared using the specified processes:

Process A—Linear Plug Flow (Used in Comparative Example 2)

A continuous polymerization apparatus composed of three plug flow reactors connected in series, wherein each plug flow reactor is divided in three zones of equal size, each zone having a separate temperature control and equipped with an agitator, is continuously charged in zone 1 with a feed composed of a rubber component, styrene, acrylonitrile, ethyl benzene and polydimethylsiloxane, at such a rate that the total residence time in the apparatus is approximately 7 hours. 1,1-di(t-butyl peroxy) cyclohexane is added to the feed line to the first reactor, n-dodecylmercaptan (nDM) (chain transfer agent) is added to different zones to optimize the rubber particle sizing and the matrix molecular weight. Table 1 contains further details with respect to applied conditions. After passing through the 3 reactors, the polymerization mixture is guided to a separation and monomer recovery step using a preheater followed by a devolatilizer and an extruder. The molten resin is stranded and cut in granular pellets. The monomers and ethyl benzene are recycled and fed to the polymerization apparatus.

Temperature ranges are: (Zone 1, 104–107° C.) (Zone 2 106–110° C.) (Zone 3 108–114° C.) (Zone 4 110–116° C.) (Zone 5 110–12° C.) (Zone 6 110–125° C.) (Zone 7 125–140° C.) (Zone 8 140–155° C.) (Zone 9150–165° C.).

Process B—Two Additions of Rubber According to EP-096447 (Used in Examples 3, 4, 5):

Process A with an additional continuous charge of the polymerization apparatus in zone 6 with a composition equal to the feed charged to zone 1 and at a rate of 25 percent relative to the rate of charging zone 1, thus decreasing the residence time from that zone on.

Process C—1 Addition of Rubber to Partial SAN Polymer in AN and Styrene Monomers (Used in $2^{nd}$ ABS of Example 1)

Process B in which the charge to zone 1 does not contain a rubber component.

Process D—Recirculation (Used in Example 5 and Comparative Example 1)

Process A with a recirculation of 30 percent of the partial polymer stream leaving the second reactor to zone 2 of the first reactor.

Rubber particle size and rubber phase volume measurements are determined using Transmission Electron Microscopy Image Analysis, wherein melt flow rate strands are produced by means of an extrusion plastometer at 220° C. and 3.8 kg load. A sample is cut to fit a microtome chuck. The area for microtomy is trimed to approximately 1 mm2 and stained with OsO4. Ultrathin sections are prepared using standard microtomy techniques. 70 nanometer thin sections are collected on Cu grids and are studied in a Hitachi H-600 Transmission Electron microscope at 100 kV. Images are collected digitally as 1024×1024 pixel computer files at three magnifications with resulting pixel resolutions of 0.005 μm/pixel (high magnification: 20k×), 0.018 μm/pixel (medium magnification: 6k×), and 0.033 μm/pixel (low magnification: 3k×).

The resulting micrographs are analyzed for rubber particle size distribution and rubber phase volume by means of the Leica QWin PRO software running on an Intel Pentium-based computer with the Microsoft Windows 98 software. Images from all three magnifications are inspected manually to determine which magnifications are useful based on the sizes of particles present. In cases where all particles present are less than 0.5 μm, the high-magnification images, only, are used. In cases where particles in the range of 0.5 μm to 5 μm are also present, the high and medium magnification images are used. Further, in cases where particles greater than 5 μm are also present, the low magnification images are also used. Objects in the image less than 5 pixels in area are considered to be noise and are ignored during analysis. Manual editing is used to eliminate other artifacts such as knife chatter. All remaining objects are treated as gel particles and measured. Particle area is measured and converted to the equivalent circle diameter which is then reported as the particle size.

Particle sizes are classified into set ranges for graphical representation and analysis. Raw particle counts at a given magnification are converted to particle counts-per-unit area in order to combine data from multiple magnifications. The counts within a classification are converted to the fractional volume of material that would be present based on the size of the class. These volumes are then plotted as a function of the class size to create the volumetric size-distribution. The volumetric size-distribution histograms from the different magnifications are compared for overlap and an optimum transition point from one magnification to the next is chosen. The transition point is usually chosen where the raw counts within a class from the higher-magnification drop below about 5 percent of the total raw counts for that magnification. The combined class data from the appropriate magnifications based on the transition points between magnifications are then used for further calculations of particle size and phase volume.

Rubber phase volume $\Phi$ in rubber reinforced styrenics resins was previously estimated by measuring gel content. Improved resins containing such small rubber particles render this method no longer feasible. $\Phi$ can be derived directly from TEM micrographs, assuming that the observed rubber phase area fraction S equals $\Phi$. This approach overestimates $\Phi$, due to section thickness effects. Such effects gain importance with increasing section thickness and/or decreasing particle size of the rubber. A stereological correction of S allows calculation of $\Phi$ within reasonable error margins:

$$\Phi = \kappa \cdot S \text{ where}$$

$$\kappa = \frac{2D_p}{3t + 2D_p}$$

The projected average diameter Dp is calculated from the results obtained from a particle size distribution measurement after correction for section thickness.

$$D_p = \frac{\sum_{i=1}^{m} N_i \cdot d_i^3}{\sum_{i=1}^{m} N_i \cdot d_i^2}$$

where

Ni: number of particles in class i after correction di: maximum diameter of class i m: total number of classes Errors in $\Phi$ are found to be mainly due to an inhomogeneous distribution of the rubber.

However, the micrographs also show particles which are not cut through the middle. A correction method developed by Scheil [E. Scheil, Z. Anorg. Allgcm. Chem. 201, 259 (1931); E. Scheil, Z. Mellkunde 27(9), 199(1935); E. Scheil, Z. Mellkunde 28(11), 240(1936)] and Schwartz [H. A. Schwartz, Metals and Alloys 5(6), 139(1934)] is slightly modified to take the section thickness into account. The measured area of each rubber particle (ai) is used to calculate the equivalent circle diameter ei: this is the diameter of a circle having the same observed area as the rubber particle. The distribution of ei is classified into m discrete size classes across the observed range of particle sizes where the size of the class is given as di and the number of particles in each class is ni. For example, with m=20 and the size range of 0 to 1 μm, the class sizes would be 0.05, 0.10, 0.15 . . . 1.0 μm. The classifications from different magnifications are combined as described above. Now the corrected class counts are given by $$N_i = \frac{n_i + \sum_{j=i+1}^{m} N_j \sqrt{d_j^2 - d_i^2} - \sqrt{d_j^2 - d_{i-1}^2}}{t + \sqrt{d_i^2 - d_{i-1}^2}}$$

where ni: number of particles in class i before correction and Nm=nm for the largest class, m.

Once Ni versus di is obtained, the following parameters are calculated:

Number average diameter $$D_n = \frac{\sum_{i=1}^{m} N_i \cdot d_i}{N}$$

Area average diameter $$D_a = \sqrt{\frac{\sum_{i=1}^{m} N_i \cdot d_i^2}{N}}$$

Volume average diameter $$D_v = \sqrt[3]{\frac{\sum_{i=1}^{m} N_i \cdot d_i^3}{N}}$$

Z+1 average diameter $D_{z+1=}$ $$\frac{\sum_{i=1}^{m} N_i \cdot d_i^4}{\sum_{i=1}^{m} N_i \cdot d_i^3}$$

Projection average diameter $$D_p = \frac{\sum_{i=1}^{m} N_i \cdot d_i^3}{\sum_{i=1}^{m} N_i \cdot d_i^2}$$

Dispersity factor 1

$$D_1 = \frac{D_v}{D_n}$$

Dispersity factor 2

$$D_2 = \frac{D_{z+1}}{D_n}$$

Intrinsic gloss is measured according to ASTM D2457-97. Intrinsic gloss specimens were molded on an Arburg 170 CMD Allrounder injection molding machine, having the following molding conditions: Barrel temperature settings of 210, 215, and 220° C.; Nozzle temperature of 225° C., Mold temperature of 30° C.; Injection pressure: 1500 bar; Holding pressure 50 bar; Holding time 6 seconds; Cavity switch pressure: 200 bar; Cooling time: 30 seconds; and injection speed: 10 cubic centimeters per second ($cm^3/s$).

The dimensions of the molded plaque are 64.2 mm×30.3 mm×2.6 mm. Intrinsic gloss is measured in the center of the plaque on the surface at which the pressure is measured. The materials are injected through one injected point located in the middle of the short side of the mold. During injection molding, the injection pressure switches to holding pressure when the cavity pressure reaches the pre-set value. The pressure transducer is located at a distance of 19.2 mm from the injection point. By using a constant pre-set cavity pressure value, the weight of the molded plaques is the same for materials with different flow characteristics.

Polishing of the mold is according to SPI-SPE1 Society of Plastic Engineers. Izod impact strength is determined according to ASTM D256-97. Melt Flow Rate is determined according to ASTM D1238-94A. Total energy to break is determined by Instrumented dart impact at 73 F by method ASTM D3763-97a.

Rubber Component 1: Functionalized Rubber

Rubber Component 2: Solprene™ 1322+Functionalized Rubber (50:50)

Rubber Component 3: Solprene™ 1110+Functionalized Rubber (50:50)

Rubber Component 4: Solprene™ 1110+Funct. Rubber+ Buna CB HX565 (40:40:20)

Rubber Component 5: Solprene™ 1322+Asaprene™ 720 (50:50)

Functionalized Rubber is anionically polymerized 13/87 styrene/butadiene block copolymer rubber having 13.5 wt. percent styrene terminated with 8,8,10,10-Tetramethyl-9-{1-(4-oxyranylmethoxy-phenyl)-ethoxy}-1,5-dioxy-9-aza-spiro{5.51}undecane described in WO 02/48109, having a 5 percent solution viscosity in styrene of 25 cPoise.

Solprene™ 1322, from DYANSOL LLC, is an anionically polymerized 30/70 styrene/butadiene diblock copolymer, having a 5 percent sol. visc. in styrene of 25 cPoise.

Solprene™ 1110, from DYNASOL LLC, is an anionically polymerized 15/85 styrene-butadiene diblock copolymer having a 5 percent solution viscosity in styrene of 35 cPoise.

Buna CB HX565, available from Bayer, is an anionically polymerized butadiene rubber, coupled with tetrafunctional component to star-branched structure, and having a 5 percent solution viscosity in styrene of 44 cPoise.

Asaprene™ 720, available from Asahi is an anionically polymerized butadiene rubber, coupled with tetrafunctional component to star-branched structure, and having a 5 percent solution viscosity of 25 cPoise.

Acrawax C: N,N'-ethylenebisstearamide wax, available from Lonza PDMS DC50: polydimethylsiloxane with 100 cStokes viscosity, from Dow Corning.

Results are listed in TABLE I.

TABLE I

| | Example | | | | | | | |
|---|---|---|---|---|---|---|---|---|
| | 1* | | 2 | 3 | 4 | 5 | Comp1 | Comp2 |
| | 90% | 10% | | | | | | |
| Process | A | C | B | B | B | D | D | A |
| Rubber Component | 1 | 5 | 2 | 3 | 4 | 3 | 2 | 2 |
| Zone 1 Feed Composition | | | | | | | | |
| Rubber component type | 1 | None | 2 | 3 | 4 | 3 | 2 | 2 |
| Rubber component (wt. %) | 14 | 0 | 14.5 | 13.5 | 13.2 | 13.5 | 14.5 | 14.5 |
| Acrylonitrile (wt. %) | 16 | 20 | 15.7 | 17.0 | 17.0 | 17.0 | 15.7 | 15.7 |
| Ethyl Benzene (wt. %) | 15 | 15 | 15.0 | 15.0 | 15.0 | 15.0 | 15.0 | 15.0 |
| Styrene (wt. %) | 55 | 65 | 54.65 | 54.35 | 54.55 | 54.35 | 54.65 | 54.65 |
| PDMS DC50 (wt. %) | 0.15 | 0.15 | 0.15 | 0.15 | 0.15 | 0.15 | 0.15 | 0.15 |
| 1,1-di(t-butyl peroxy) cyclohexane (ppm) | 100 | 200 | 140 | 145 | 145 | 120 | 100 | 140 |
| NDM (to zone 1) (ppm) | 200 | 0 | 350 | 350 | 350 | 0 | 0 | 300 |
| NDM (to zone 4) (ppm) | 1200 | 460 | 0 | 0 | 0 | 1300 | 1200 | 0 |
| NDM (to zone 5) (ppm) | 0 | 0 | 1700 | 2000 | 1700 | 0 | 0 | 1700 |
| NDM (to zone 6) (ppm) | 1600 | 0 | 0 | 0 | 0 | 0 | 0 | 0 |
| NDM (to zone 7) (ppm) | 0 | 1520 | 0 | 500 | 500 | 750 | 900 | 0 |
| % Recycling to zone 5 | | 0 | 6 | 0 | 0 | 0 | 0 | 6 |
| % Feed to zone 5 (relative to zone 1) | 0 | 123 | 25 | 25 | 25 | 0 | 0 | 0 |
| Zone 5 Feed composition | | | | | | | | |
| Rubber component type | | 5 | 2 | 3 | 4 | | | |
| Rubber component (wt. %) | | 17.5 | 14.5 | 13.5 | 13.2 | | | |
| Acrylonitrile (wt. %) | | 16 | 15.7 | 17.0 | 17.0 | | | |
| Styrene (wt. %) | | 51.5 | 15.0 | 15.0 | 15.0 | | | |
| Ethyl Benzene (wt. %) | | 15 | 54.65 | 54.35 | 54.55 | | | |
| PDMS DC50 (wt. %) | | 0.15 | 0.15 | 0.15 | 0.15 | | | |
| Acrawax C (wt. %) to zone 6 | 0 | 0 | 0 | 0.9% | 0.9% | 1.1% | 0 | 0 |
| Recirculation to zone 2 | 0 | 0 | 0 | 0 | 0 | 30 | 30 | 0 |
| RPM first reactor | 80 | 120 | 120 | 120 | 120 | 120 | 120 | 120 |
| RPM second reactor | 60 | 60 | 80 | 80 | 90 | 75 | 80 | 100 |
| RPM third reactor | 30 | 30 | 20 | 25 | 25 | 25 | 25 | 25 |
| End product properties | | | | | | | | |
| Rubber Particle Size (RPS) Dn (micron) | | | 0.21 | 0.21 | 0.24 | 0.24 | 0.20 | 0.16 |
| RPS Dv (micron) | | 0.24 | 0.25 | 0.25 | 0.30 | 0.27 | 0.24 | 0.18 |
| RPS D(z + 1) | | | 0.34 | 0.35 | 0.42 | 0.32 | 0.29 | 0.21 |
| $D_2 = (D(z + 1)/Dn)$ | | | 1.61 | 1.67 | 1.75 | 1.33 | 1.45 | 1.31 |
| Composition | | | | | | | | |
| Acrawax C (wt. %) | | 1 | 0 | 1.5 | 1 | 1.5 | 1.5 | 0 |
| Acrylonitrile (%) | | 22 | 20.6 | 21.2 | 20.4 | 21.1 | 19.5 | 20.5 |
| Polybutadiene fraction (%) | | 13.8 | 15.3 | 15.5 | 14.8 | 15.1 | 14.6 | 13.5 |
| Total Rubber (wt. %) | | 16.2 | 19.6 | 17.6 | 16.3 | 17.1 | 18.7 | 17.3 |
| Total Rubber Phase Volume $\Phi$ (%) | | 21.0 | 27.3 | 31.4 | 32.3 | 27.2 | 30.6 | 24.5 |
| Rubber Phase Volume > 0.4 micron $\Phi^+$ (%) | | 2.5 | 7.9 | 10.7 | 14.2 | 3.8 | 1.2 | 0.2 |
| $100 \times \Phi^+/\Phi$ (%) | | 12 | 29 | 34 | 44 | 14 | 4 | <1 |
| Mw (/1000) (g/mole) | | 113 | 138 | 125 | 123 | 133 | 131 | 151 |
| Mn (/1000)(g/mole) | | 39 | 47 | 40 | 42 | 48 | 46 | 47 |
| Mw/Mn | | 2.90 | 2.94 | 3013 | 3.15 | 2.77 | 2.85 | 3.21 |
| % Crosslinked Rubber | | — | 93 | 94 | 95 | 95 | 99 | — |
| Intrinsic Gloss | | 79 | 83 | 82 | 81 | 83 | 85 | 79 |
| MFR(g/10 min) | | 4.5 | 3.3 | 4.8 | 4.5 | 4.8 | 4.8 | 1.9 |
| Izod(J/m) | | 246 | 406 | 342 | 368 | 358 | 224 | 43 |
| Total Energy (J) | | 44 | 43 | 44 | 37 | 36 | 13 | 4 |

*Example 1 is 90 wt. % of product produced with process A and 10 wt. % of a product produced with process B.
% Crosslinked rubber is determined according to the process described in the specification.

The invention claimed is:

1. A mass polymerized rubber-modified polymeric composition comprising:

a continuous matrix phase comprising a polymer of a monovinylidene aromatic monomer, and optionally, an ethylenically unsaturated nitrile monomer, and discrete rubber particles dispersed in said matrix, said rubber particles produced from a rubber component comprising from 5 to 100 weight percent of a functionalized diene rubber having at least one functional group per rubber molecule capable of enabling controlled radical polymerization;

wherein the composition is further characterized by:

a) a volume average rubber particle size of from about 0.15 to 0.35 micron, b) a total rubber phase volume between 12 and 45 percent, based on the total volume of the combination of the matrix phase and the rubber particles;

c) a partial rubber phase volume between 2 and 20 percent characterized by rubber particles having a volume average particle size of greater than 0.40 microns; and d) a crosslinked rubber fraction of at least 85 percent by weight, based on the total weight of the rubber particles.

2. The composition of claim 1 wherein the matrix phase comprises a copolymer of styrene and acrylonitrile.

3. The composition of claim 1 wherein the matrix phase comprises a styrene homopolymer.

4. The composition of claim 1 wherein the matrix phase polymer further comprises butylacrylate, N-phenyl maleimide or combinations thereof.

5. The composition of claim 1 wherein the rubber component comprises a functionalized styrene/butadiene block copolymer.

6. The composition of claim 5 wherein the styrene/butadiene rubber comprises at least 5 wt. percent styrene polymer block, based on the total weight of the block copolymer.

7. The composition of claim 6 wherein the styrene/butadiene rubber comprises at least 10 wt. percent styrene polymer block, based on the total weight of the block copolymer.

8. The composition of claim 5 wherein the block copolymer is functionalized with: 2,2,6,6,-tetramethyl-1-piperidinyloxy (TEMPO); 2,2,6,6-tetramethyl-1-[1-[4-(oxiranylmethoxy)phenyl]ethoxy]-piperidine; or 3,3,8,8,10,10-hexamethyl-9-[1-[4-(oxiranylmethoxy)phenyl]ethoxy]-1,5-dioxa-9-azaspiro[5.5]undecane.

9. The composition of claim 1 wherein the functionalized rubber contains a functional group capable of atom transfer radical polymerization.

10. The composition of claim 1 wherein the functional group is capable of reversible addition-fragmentation chain transfer polymerization.

11. The composition of claim 1 wherein the discrete rubber particles have a monomodal particle size distribution of 1.25 or more.

12. The composition of claim 1 wherein the discrete rubber particles have a bimodal particle size distribution, comprising larger rubber particles and smaller rubber particles.

13. The composition of claim 12 wherein the smaller rubber particles are produced from a functionalized rubber and the larger rubber particles are produced from a non-functionalized rubber.

14. An article produced from the composition of claim 1.

* * * * *